(12) United States Patent
Sachs

(10) Patent No.: US 12,400,021 B2
(45) Date of Patent: Aug. 26, 2025

(54) SYSTEMS AND METHODS FOR PROCESSING DIGITAL EVIDENCE

(71) Applicant: NETMASTER SOLUTIONS LTD., London (GB)

(72) Inventor: Paul Sachs, West Sussex (GB)

(73) Assignee: Thomson Reuters Enterprise Centre GmbH, Zug (CH)

( * ) Notice: Subject to any disclaimer, the term of this patent is extended or adjusted under 35 U.S.C. 154(b) by 605 days.

(21) Appl. No.: 17/765,415

(22) PCT Filed: Mar. 18, 2020

(86) PCT No.: PCT/GB2020/050697
§ 371 (c)(1),
(2) Date: Mar. 30, 2022

(87) PCT Pub. No.: WO2021/069854
PCT Pub. Date: Apr. 15, 2021

(65) Prior Publication Data
US 2022/0335124 A1    Oct. 20, 2022

(30) Foreign Application Priority Data

Oct. 7, 2019  (GB) ...................................... 1914479
Oct. 7, 2019  (GB) ...................................... 1914480

(51) Int. Cl.
*G06F 21/62*    (2013.01)
*G06F 21/55*    (2013.01)

(52) U.S. Cl.
CPC ........ *G06F 21/6245* (2013.01); *G06F 21/552* (2013.01); *G06F 2221/031* (2013.01)

(58) Field of Classification Search
CPC ............... G06F 21/6245; G06F 21/552; G06F 2221/031
(Continued)

(56) References Cited

U.S. PATENT DOCUMENTS 7,716,461 B2 *  5/2010  Downer .............. G06F 11/1438
                                                        713/340
10,127,196 B2 * 11/2018  Moore ............... G06Q 10/1093
(Continued)

FOREIGN PATENT DOCUMENTS

WO    2007014398 A2    2/2007
WO    2017136236 A1    8/2017
WO    2021069854 A1    4/2021

OTHER PUBLICATIONS

Canadian Intellectual Property Office, Office Action for Application No. 31569638, mail date Feb. 29, 2024, 3 total pages.
(Continued)

*Primary Examiner* — Thanh T Le
(74) *Attorney, Agent, or Firm* — SoCal IP Law Group LLP; Mark Andrew Goldstein

(57) ABSTRACT

A computer-implemented method for processing digital evidence, the method comprising: storing a digital media file (4); in response to a request from a first user to access the digital media file (4): redacting a first portion of content from a copy of the digital media file (4) to produce a first redacted digital media file (10); and providing the first redacted digital media file (10) to the first user; and in response to a request from a second user to access the digital media file (4): redacting a second portion of content from a further copy of the digital media file (4) to produce a second redacted digital media file (11), wherein the second portion of content is at least partly different from the first portion of content; and providing the second redacted digital media file (11) to the second user, such that the first and second users are provided with copies of the digital media file (4) that are redacted differently from one another.

16 Claims, 8 Drawing Sheets

(58) Field of Classification Search
    USPC .......................................................... 726/22
    See application file for complete search history.

(56) References Cited

U.S. PATENT DOCUMENTS

| | | | |
|---|---|---|---|
| 2004/0153456 A1* | 8/2004 | Charnock | G06F 16/242 |
| 2006/0271526 A1 | 11/2006 | Charnock et al. | |
| 2007/0094594 A1* | 4/2007 | Matichuk | G06F 40/253 |
| | | | 715/255 |
| 2013/0297559 A1 | 11/2013 | Bailor et al. | |
| 2015/0089663 A1* | 3/2015 | Gile | G06F 21/6218 |
| | | | 726/27 |
| 2015/0294259 A1* | 10/2015 | Collins | G06Q 10/063114 |
| | | | 705/7.15 |
| 2016/0012027 A9* | 1/2016 | Rebstock | G06F 40/166 |
| | | | 715/255 |
| 2017/0357501 A1* | 12/2017 | Ledet | G06F 8/33 |
| 2021/0042530 A1* | 2/2021 | Kim | G06V 20/46 |
| 2021/0373840 A1* | 12/2021 | Morris | G09G 5/14 |

OTHER PUBLICATIONS

New Zealand Intellectual Property Office, Patent Examination Report for Application No. 786727, mail date Nov. 22, 2023, 5 total pages.
World Intellectual Property Organization, International Search Report for international application No. PCT/GB2020/050697, mail date Jun. 16, 2022, 3 total pages.

* cited by examiner

SYSTEMS AND METHODS FOR PROCESSING DIGITAL EVIDENCE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from International PCT Patent Application No. PCT/GB2020/050697, filed Mar. 18, 2020 entitled, "SYSTEMS AND METHODS FOR PROCESSING DIGITAL EVIDENCE", which claims priority to United Kingdom Application Nos. 1914480.7, filed Oct. 7, 2019 and 1914479.9, filed Oct. 7, 2019, all of which are incorporated herein by reference in their entirety.

FIELD

The present invention relates to systems and methods for processing digital evidence. The present invention more particularly relates to systems and methods for processing digital evidence by selectively redacting content and/or by adding action data.

BACKGROUND

There is often a need to redact information from documents during legal proceedings for legal or security purposes. A redaction is a solid area of colour (often black) on a page that obscures a part of a document.

Traditionally, redactions have been applied with a thick black pen directly to paper documents. However, today redactions are typically applied electronically to obscure or remove a portion of an electronic document. For instance, redactions may be applied to a PDF document using PDF manipulation software.

In both traditional paper redaction and current electronic redaction, the redactions are fixed on the document, regardless of who is looking at the document.

Fixed redactions introduce significant complications in legal proceedings since it is often the case that a document needs to be redacted differently depending on who is reading the document. A good example would be a sensitive legal matter in which the complete document must be viewed by the judge, parts of the document must be hidden from one party and other parts of the document must be hidden from another party. Often there can be as many as ten different parties which each require a differently redacted version of a document.

Further complications arise in legal proceedings due to the fact that there are often multiple different parties that are required to review documents and carry out specific tasks. There are typically groups of people that span organisational boundaries that are required to review documents. Following a review of the documents, it is often the case that one person will require an action from another person within the review group. For example, in a courtroom scenario, a judge may require a new document to be added to the current documents that are presented in a case. This could be an expert report that the respondent is required to provide.

There is a need for improved systems and methods for processing digital evidence which seek to alleviate at least some of the problems described herein.

SUMMARY

According to one aspect of the present invention, there is provided a computer-implemented method for processing digital evidence, the method comprising: storing a digital media file; in response to a request from a first user to access the digital media file: redacting a first portion of content from a copy of the digital media file to produce a first redacted digital media file; and providing the first redacted digital media file to the first user; and in response to a request from a second user to access the digital media file: redacting a second portion of content from a further copy of the digital media file to produce a second redacted digital media file, wherein the second portion of content is at least partly different from the first portion of content; and providing the second redacted digital media file to the second user, such that the first and second users are provided with copies of the digital media file that are redacted differently from one another.

In some embodiments, the method further comprises: storing first redaction data for the first user, the first redaction data being indicative of the first portion of content to be redacted from the digital media file; and storing second redaction data for the second user, the second redaction data being indicative of the second portion of content to be redacted from the digital media file.

In some embodiments, the method further comprises: providing a copy of the digital media file to a third user without redacting content from the digital media file.

In some embodiments, the media file comprises at least one of: textual data and redacting a portion of content comprises redacting a portion of the textual data; image data and redacting a portion of content comprises redacting a portion of the image data; video data and redacting a portion of content comprises redacting a portion of the video data; or audio data and redacting a portion of content comprises redacting a portion of the audio data.

In some embodiments, the method further comprises: storing a plurality of groups of digital media files; and limiting access to at least one of the groups of digital media files by at least one user.

In some embodiments, redacting content from the copy of the digital media file comprises obfuscating data in the portion of the digital media file.

In some embodiments, redacting content from the copy of the digital media file comprises deleting data from the portion of the digital media file.

In some embodiments, the method further comprises: providing a digital media file to a primary user device; receiving action data from the primary user device, the action data being indicative of an action which is required by a further user in relation to the digital media file; storing the action data with a link to the digital media file; and providing the digital media file and the action data to a further user device, such that a further user can perform the action that is required in relation to the digital media file.

According to another aspect of the present invention, there is provided a computer-implemented method for processing digital evidence, the method comprising: providing a digital media file to a primary user device; receiving action data from the primary user device, the action data being indicative of an action which is required by a further user in relation to the digital media file; storing the action data with a link to the digital media file; and providing the digital media file and the action data to a further user device, such that a further user can perform the action that is required in relation to the digital media file.

In some embodiments, the method further comprises: receiving comment data from the primary user device, the comment data comprising information input by a user of the primary user device; storing the comment data with a link to the digital media file; and providing the comment data with the digital media file to the further user device, such that a further user can consider the comment data when performing the action that is required in relation to the digital media file.

In some embodiments, the action data comprises due date data which is indicative of a time and date by which the action is to be performed by the further user.

In some embodiments, the method further comprises: sending a notification to the further user to notify the further user that an action is required in relation to the digital media file.

In some embodiments, the notification is at least one of an email or a calendar invitation.

According to another aspect of the present invention, there is provided a system for processing digital evidence, the system comprising a processor and a memory, wherein the system is configured to perform the method of any one of claims 1 to 13 as defined hereinafter.

According to another aspect of the present invention, there is provided a computer readable medium storing instructions which, when executed by a computing device, cause the computing device to perform the method of any one of claims 1 to 13 as defined hereinafter.

BRIEF DESCRIPTION OF THE DRAWINGS

So that the present invention may be more readily understood, embodiments of the present invention will now be described, by way of example, with reference to the accompanying drawings, in which.

DETAILED DESCRIPTION

Figure 1:
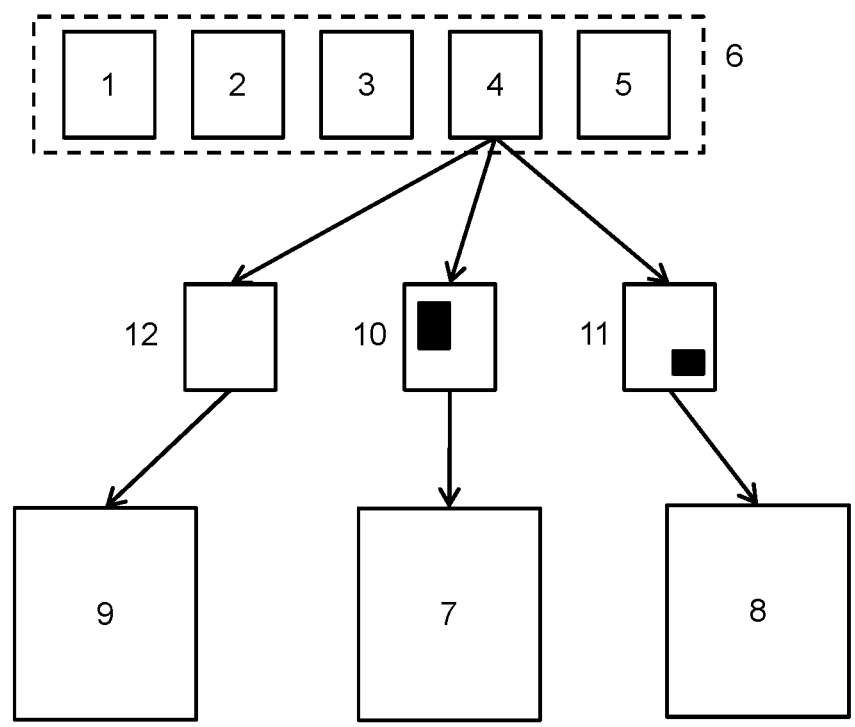
FIG. 1 is a schematic diagram showing the operation of a method of some embodiments.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

The following disclosure provides many different embodiments, or examples, for implementing different features of the provided subject matter. Specific examples of components, concentrations, applications and arrangements are described below to simplify the present disclosure. These are, of course, merely examples and are not intended to be limiting. For example, the attachment of a first feature and a second feature in the description that follows may include embodiments in which the first feature and the second feature are attached in direct contact, and may also include embodiments in which additional features may be positioned between the first feature and the second feature, such that the first feature and the second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Referring initially to FIG. 1 of the accompanying drawings, a computer-implemented method of some embodiments is for processing digital evidence by selectively redacting one or more digital media files. The digital media file may be any type of digital media file. The digital media file may comprise at least one of textual data, image data, video data or audio data or any combination of these types of data. For example, in legal proceedings, the digital media file may be an electronic document comprising text and an image. Alternatively, the digital media file may be a video or audio recording.

FIG. 1 shows an example in which there are five digital media files 1-5 which collectively make up an electronic bundle 6. The digital media files 1-5 provide an evidence set for use in legal proceedings.

During legal proceedings, the digital media files 1-5 in the electronic bundle 6 must be viewed by different parties that are involved in legal proceedings, as well as the judge and the court. In the example shown in FIG. 1, a digital media file 4 is to be provided to a first user 7, a second user 8 and a third user 9. In this example, the first user 7 is one party in legal proceedings, the second user 8 is another party in the proceedings and the third user 9 is the presiding judge.

In the method of some embodiments, the digital media file 4 is stored in its original (un-redacted) form. The digital media file 4 is preferably stored in a secure location, such as in an encrypted secure storage facility.

In response to a request from the first user 7 to access the digital media file 4, the method comprises redacting a first portion of content from a copy of the digital media file 4 to produce a first redacted digital media file 10. The first redacted digital media file 10 is then provided to the first user 7.

In response to a request from the second user 8 to access the digital media file 4, the method comprises redacting a second portion of content from a further copy of the digital media file 4 to produce a second redacted digital media file 11. The second portion of content that is redacted from the digital media file 4 is different from the first portion of content that is redacted from the digital media file 4. The method comprises providing the second redacted digital media file 11 to the second user 8.

The method therefore enables differently redacted copies of the digital media file 4 to be provided respectively to the first and second users 7, 8.

In the example shown in FIG. 1, the method comprises providing an un-redacted copy 12 of the digital media file 4 to a third user 9. In this example, the third user 9 is a judge or another person at the court who is permitted to access the un-redacted version of the digital media file 4.

In some embodiments, the method comprises storing first redaction data for the first user 7, the first redaction data being indicative of the first portion of content to be redacted from the digital media file 4. In this embodiment, the method comprises storing second redaction data for the second user 8, the second redaction data being indicative of the second portion of content to be redacted from the digital media file 4.

Figure 2:
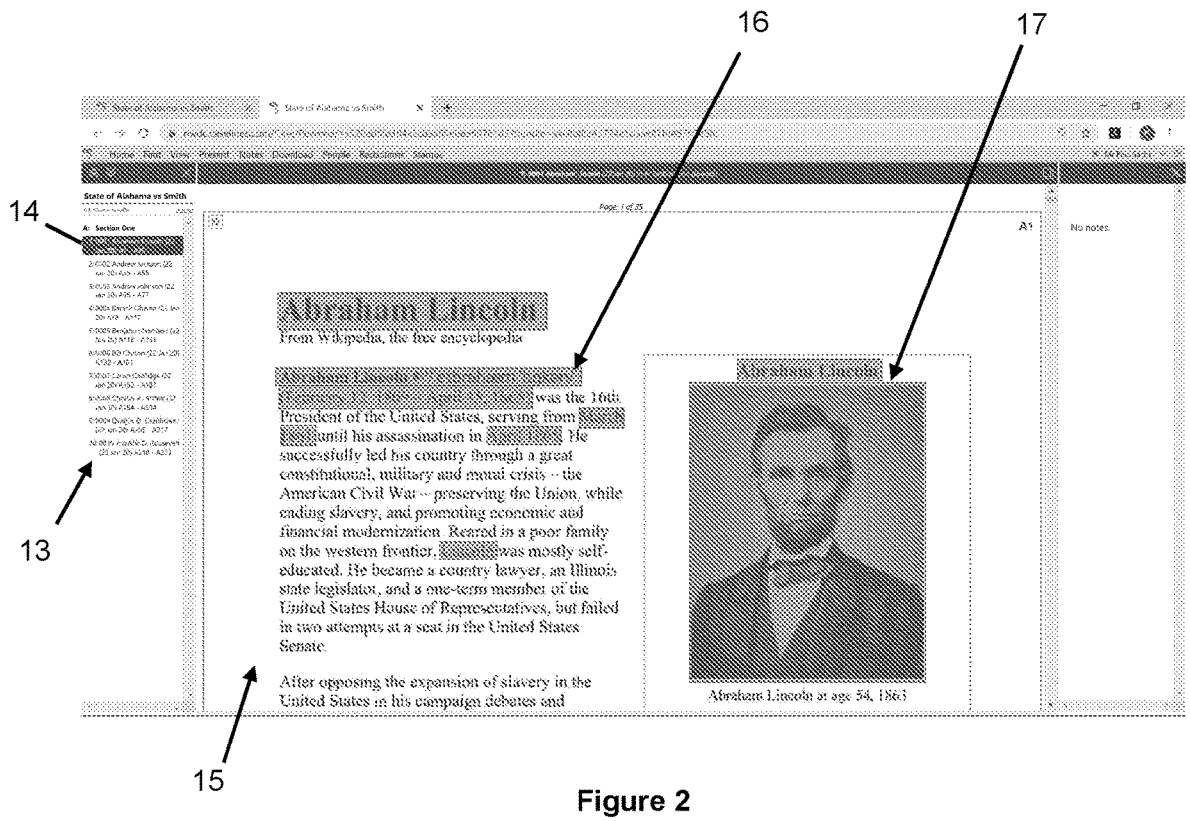
FIG. 2 is an example of a digital media file being processed in accordance with some embodiments.

Referring to FIG. 2 of the accompanying drawings, a system of some embodiments is shown in operation, with a list of documents or electronic media files being presented in a bundle section 13 which is displayed on a screen. The screenshot in FIG. 2 is a screenshot of a graphical user interface of some embodiments which is being viewed on a user's computing device. The first digital media file 14 of the bundle 13 is selected and content 15 of the digital media file 14 is displayed adjacently.

In this example, the digital media file 14 is a document which provides information about Abraham Lincoln. The document comprises textual data 16 and image data 17.

In the example shown in FIG. 2, the names, dates and the image are highlighted for redaction. The highlighted portions are the portions of content that are to be redacted from the digital media file selectively according to who is viewing the digital media file.

Figure 3:
FIG. 3 is an example of a digital media file being processed in accordance with some embodiments.

If a user, such as a judge, requests access to the bundle 13, no redactions are applied, such that the judge views an original (un-redacted) copy of the digital media file 14. As shown in FIG. 3, the names, dates and the image are not redacted when the digital media file is being viewed on screen.

Figure 4:
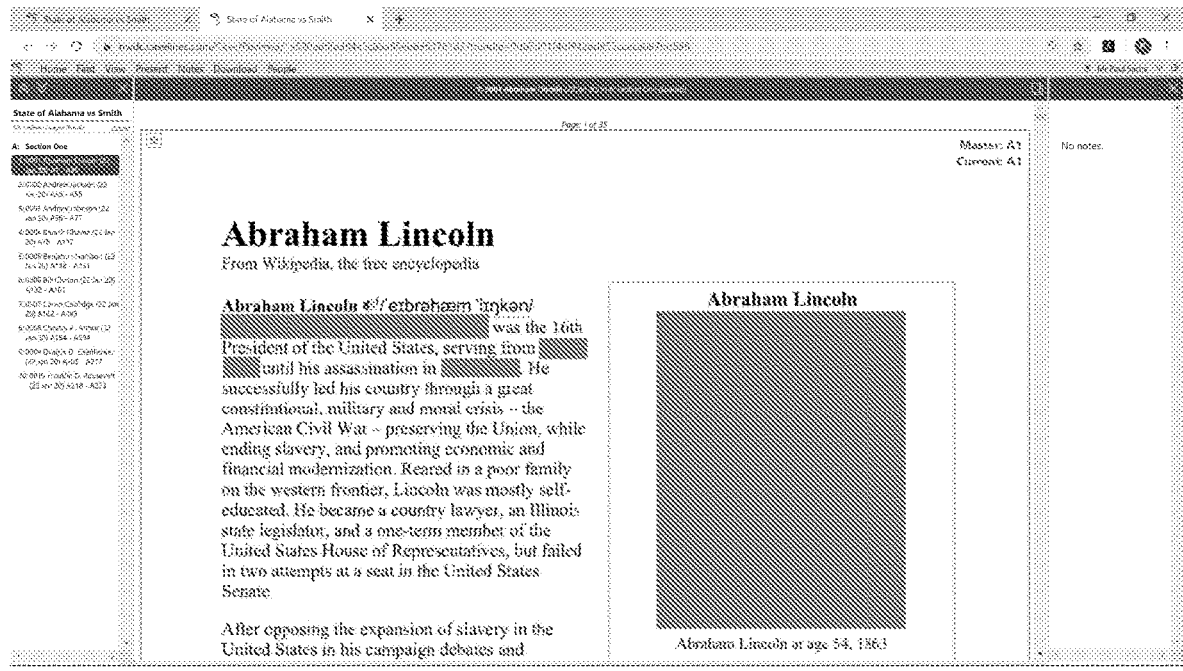
FIG. 4 is an example of a digital media file being processed in accordance with some embodiments.

Referring to FIG. 4 of the accompanying drawings, when the digital media file 14 is accessed by a first user, such as a defence lawyer, the bundle 13 is redacted such that a first portion of content is redacted from a copy of the digital media file 14. In this example, the first portion of content which is redacted comprises the dates from the text and the image.

Figure 5:
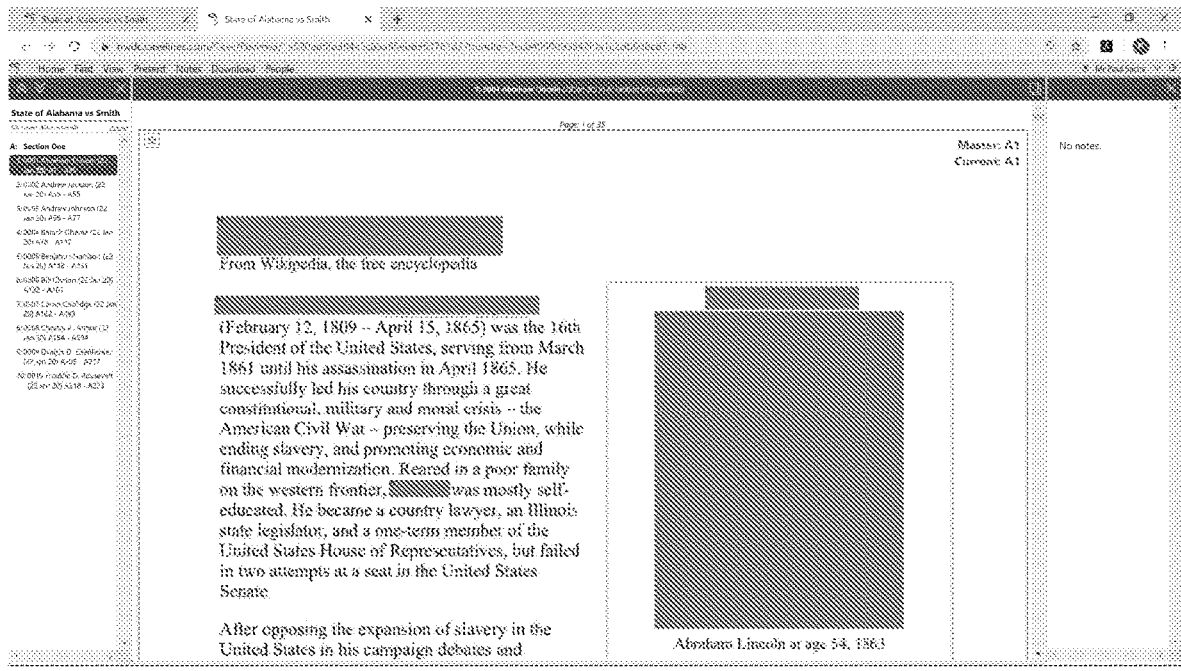
FIG. 5 is an example of a digital media file being processed in accordance with some embodiments.

Referring now to FIG. 5 of the accompanying drawings, if the bundle 13 is accessed by a second user, the bundle 13 is redacted such that the digital media file 14 is redacted differently from the copy which is accessed by the first user. In this example, the second user is an expert witness and the name "Abraham Lincoln" and the image is redacted from the digital media file 14 when the digital media file 14 is presented to the second user.

The method of some embodiments therefore enables a digital media file to be redacted appropriately for the user accessing the digital media file. In some embodiments, the redactions are stored separately from the digital media file and are applied at the point at which the digital media file is provided to a user. The embodiments therefore seek to overcome the technical difficulties that are encountered when redactions are fixed, such as on paper or by PDF manipulation.

The selective redaction of content for different users optimises the technical operation of a system for processing and providing digital evidence. For example, the system is optimised by minimising the amount of data that must be stored and transferred as compared with a conventional system where multiple copies of each digital media file with fixed redactions must be stored and transmitted between multiple different parties.

The method of some embodiments stores a plurality of groups of digital media files, for instance in a digital bundle of evidence. In some embodiments, the method limits access to at least one of the groups of digital media files by at least one user, thereby restricting access to the digital media files to certain users.

In some embodiments, redacting content from a digital media file comprises obfuscating data in a portion of the digital media file. In other embodiments, instead of or in addition to obfuscating data, the method redacts content by deleting data from a digital media file.

In cases where the digital media file comprises a video or audio recording, the redaction occurs by removing a portion of the video or audio recording between timestamps in the recording or by blurring the face of an individual or by blurring an artifact that is visible in the media.

While the example shown in FIG. 1 is a relatively simplistic example, with three users 7-9 accessing one digital media file 4, it is to be appreciated that in practice the method may be carried out for any number of users and any number of digital media files. The improvements due to the reduction in data storage and transfer become particularly apparent when there are a large number of digital media files in a bundle that need to be accessed by multiple parties.

Figure 6:
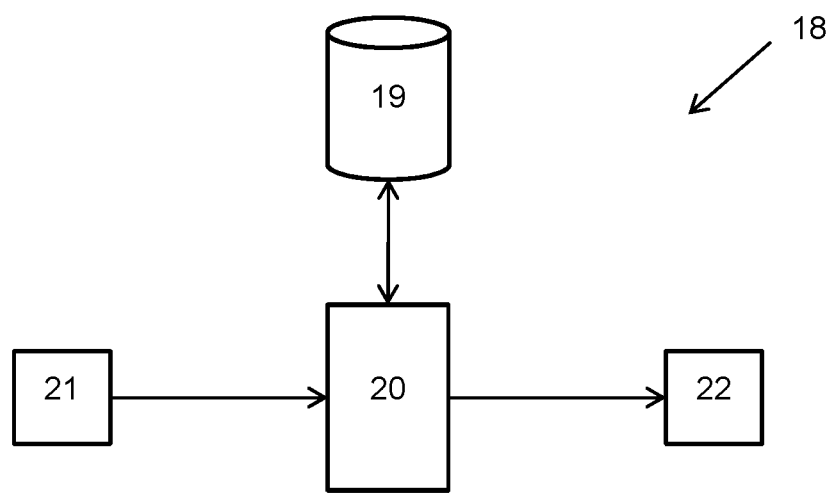
FIG. 6 is a schematic diagram of a system of some embodiments.

Referring now to FIG. 6 of the accompanying drawings, a system 18 of some embodiments comprises a memory 19 for storing digital media files. The memory 19 is preferably a secure storage memory which stores the digital media files in encrypted form. In some embodiments, the memory 19 is a network-connected memory which may be in the cloud.

The system 18 further comprises a processor 20 which is configured to process the digital media files in the memory 19. The system comprises an input module 21 which is configured to receive requests from users. The system 18 further comprises an output module 22 which is configured to output data, such as redacted copies of digital media files, to the users according to the method described above.

In some embodiments, the system 18 is implemented in a computing device or server which is configured to communicate with at least one remote user device. In some embodiments, the user device is a device selected from a group including, but not limited to a laptop computer, a desktop computer, a smartphone or a tablet.

Further methods and systems of some embodiments will now be described which seek to assist groups of users in reviewing and processing digital evidence.

In some embodiments, the method provides a digital media file to a primary user device. For instance, the digital media file may be a document which is to be displayed on the primary user device. The method comprises receiving action data from the primary user device, the action data being indicative of an action which is required by a further user in relation to the digital media file. For example, a user of the primary user device adds action data to the digital media file by adding an active note 23 which is associated with the text of a document. In this example, the active note states that the user requires sight of the video within ten working days, thereby setting an action for a further user to perform in relation to the digital media file.

The method comprises providing the digital media file and the action data to a further user device, such that a further user can perform the action that is required in relation to the digital media file. In the example shown in FIG. 7, the further user is required to provide the video to the first user within ten working days.

The method stores the action data with a link to the digital media file, preferably in the memory 19 of the system 18. The action data and the link to the digital media file can be changed or deleted once the further user has performed the action.

Figure 7:
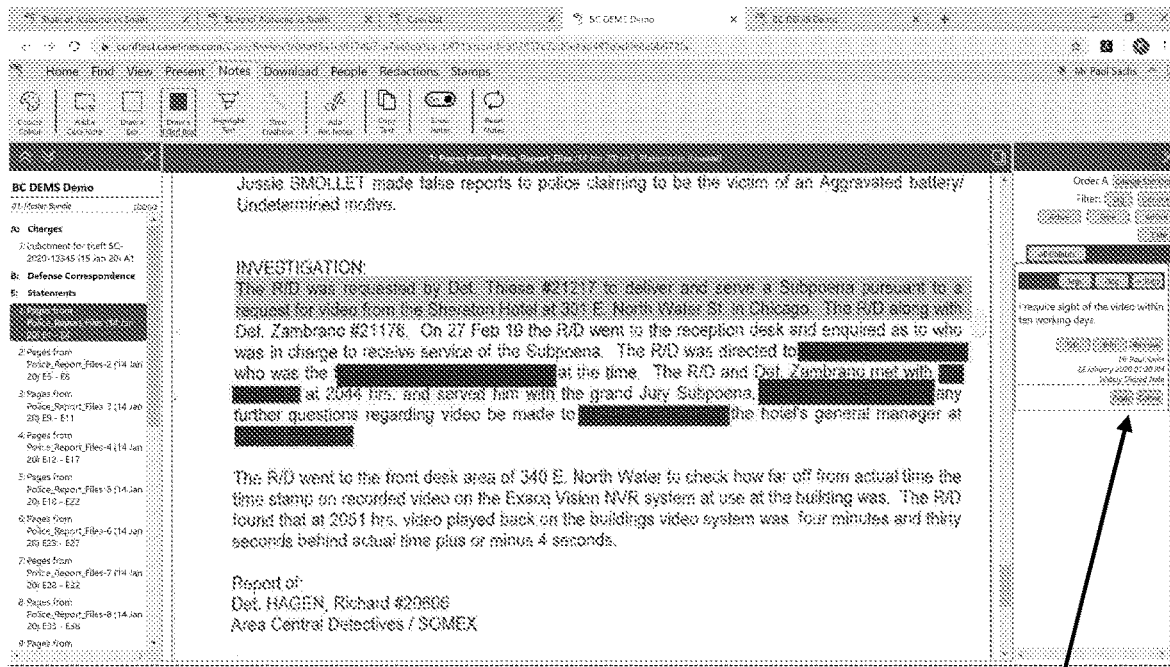
FIG. 7 is an example of a digital media file being processed in accordance with some embodiments.

In some embodiments, the method comprises receiving comment data from the primary user device, the comment data comprising information input by a user of the primary user device, for instance to provide a note on a document, as shown in FIG. 7. The comment data is stored with a link to the digital media file. The method comprises providing the comment data with the digital media file to the further user device such that the further user can consider the comment data when performing the action that is required in relation to the digital media file.

Figure 8:
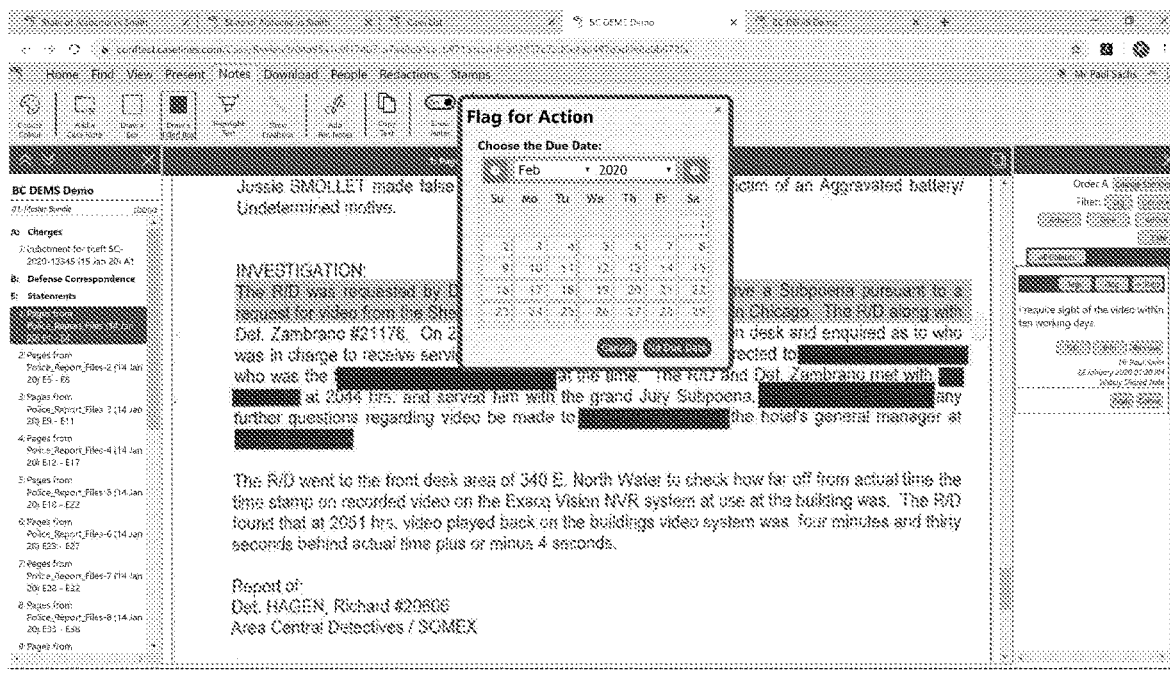
FIG. 8 is an example of a digital media file being processed in accordance with some embodiments.

In some embodiments, the action data comprises due date data which is indicative of a time and date by which the action is to be performed by the further user. FIG. 8 shows an example in which due date data is being entered via a user interface of the system to indicate a time and date by which an action is to be performed by the further user. In some embodiments, once the due date data has been entered, the system displays the digital media file differently, to notify users that there is a due date associated with the digital media file.

In some embodiments, the method sends a notification to the further user to notify the further user that an action is required in relation to the digital media file. In some embodiments, the notification is at least one of an email or a calendar invitation. Embodiments therefore seek to solve the problem in the context of reviewing documents or how to get another person in a different organisation to perform a task in relation to a document. The methods and systems elevate document notes into a valuable workflow to provide methods and systems of processing digital evidence which are more efficient.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described features (e.g., elements, resources, etc.), the terms used to describe such features are intended to correspond, unless otherwise indicated, to any features which performs the specified function of the described features (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

Embodiments of the subject matter and the functional operations described herein can be implemented in digital electronic circuitry, or in computer software, firmware, or hardware, including the structures disclosed in this specification and their structural equivalents, or in combinations of one or more of them.

Some embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some embodiments are implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

It is claimed:

1. A computer-implemented method for processing digital evidence, the method comprising:
   storing a digital media file;
   in response to a request from a first user to access the digital media file:
      redacting a first portion of content from a copy of the digital media file to produce a first redacted digital media file; and
      providing the first redacted digital media file to the first user;
      receiving action data from the first user, the action data being indicative of an action which is required by a second user in relation to the digital media file;
      storing the action data with a first link to the digital media file; and
   in response to a request from the second user to access the digital media file:
      redacting a second portion of content from a further copy of the digital media file to produce a second redacted digital media file, wherein the second portion of content is at least partly different from the first portion of content; and
      providing the second redacted digital media file and the action data to the second user, such that the first and second users are provided with copies of the digital media file that are redacted differently from one another and such that the second user can perform the action that is required in relation to the digital media file.

2. The method of claim 1, wherein the method further comprises:
   storing first redaction data for the first user, the first redaction data being indicative of the first portion of content to be redacted from the digital media file; and
   storing second redaction data for the second user, the second redaction data being indicative of the second portion of content to be redacted from the digital media file.

3. The method of claim 1, wherein the method further comprises:
   providing a copy of the digital media file to a third user without redacting content from the digital media file.

4. The method of claim 1, wherein the digital media file comprises at least one of:
   textual data and redacting a portion of content comprises redacting a portion of the textual data;
   image data and redacting a portion of content comprises redacting a portion of the image data;
   video data and redacting a portion of content comprises redacting a portion of the video data; and
   audio data and redacting a portion of content comprises redacting a portion of the audio data.

5. The method of claim 1, wherein the method further comprises:
   storing a plurality of groups of digital media files; and limiting access to at least one of the groups of digital media files by at least one user.

6. The method of claim 1, wherein redacting content from the copy of the digital media file comprises obfuscating data in the portion of the digital media file.

7. The method of claim 1, wherein redacting content from the copy of the digital media file comprises deleting data from the portion of the digital media file.

8. The method of claim 1, wherein the method further comprises:
receiving comment data from the first user, the comment data comprising information input by the first user;
storing the comment data with a second link to the digital media file; and
providing the comment data with the digital media file to the second user, such that the second user can consider the comment data when performing the action that is required in relation to the digital media file.

9. The method of claim 1, wherein the action data comprises due date data which is indicative of a time and date by which the action is to be performed by the second user.

10. The method of claim 9 1, wherein the method further comprises:
sending a notification to the second user to notify the second user that an action is required in relation to the digital media file.

11. The method of claim 10, wherein the notification is at least one of an email or a calendar invitation.

12. A system for processing digital evidence, the system comprising a processor and a memory, wherein the memory stores executable instructions which, when executed by the processor, cause the processor to:
store a digital media file;
in response to a request received by the system from a first user to access the digital media file:
redact a first portion of content from a copy of the digital media file to produce a first redacted digital media file; and
provide the first redacted digital media file to the first user;
receive action data from the first user, the action data being indicative of an action which is required by a second user in relation to the digital media file;
store the action data with a first link to the digital media file; and
in response to a request from the second user to access the digital media file:
redact a second portion of content from a further copy of the digital media file to produce a second redacted digital media file, wherein the second portion of content is at least partly different from the first portion of content; and
provide the second redacted digital media file and the action data to the second user, such that the first and second users are provided with copies of the digital media file that are redacted differently from one another and such that the second user can perform the action that is required in relation to the digital media file.

13. The method of claim 12, wherein the method further comprises:
receiving comment data from the first user, the comment data comprising information input by the first user;
storing the comment data with a second link to the digital media file; and
providing the comment data with the digital media file to the second user, such that the second user can consider the comment data when performing the action that is required in relation to the digital media file.

14. The method of claim 12, wherein the action data comprises due date data which is indicative of a time and date by which the action is to be performed by the second user.

15. The method of claim 12, wherein the method further comprises:
sending a notification to the second user to notify the second user that an action is required in relation to the digital media file.

16. The method of claim 15, wherein the notification is at least one of an email or a calendar invitation.

* * * * *